Dec. 3, 1940.   E. F. STONER   2,223,746
VEHICLE BODY CONSTRUCTION
Filed Sept. 3, 1938   9 Sheets-Sheet 1
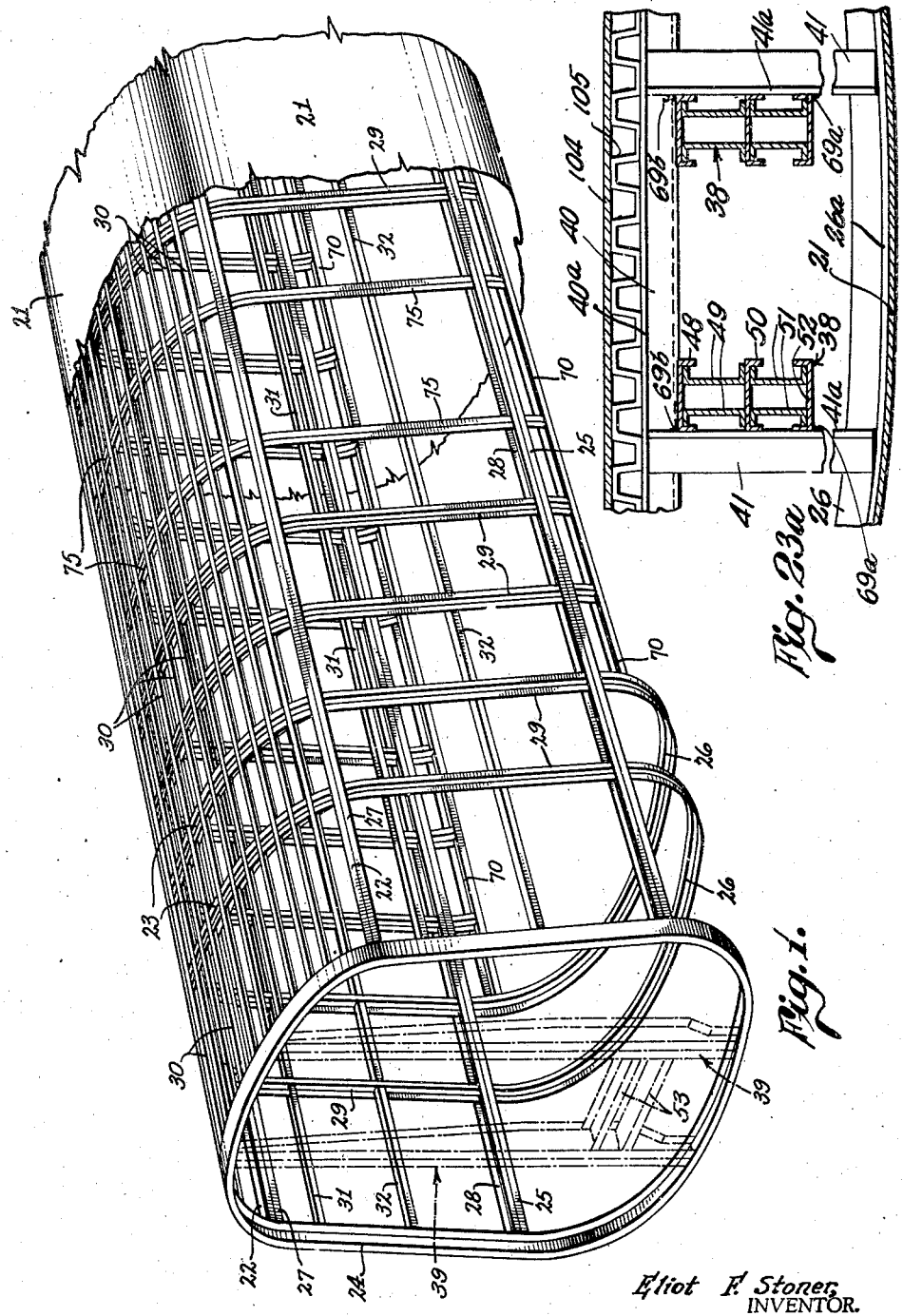
Eliot F. Stoner
INVENTOR.
BY
ATTORNEY.

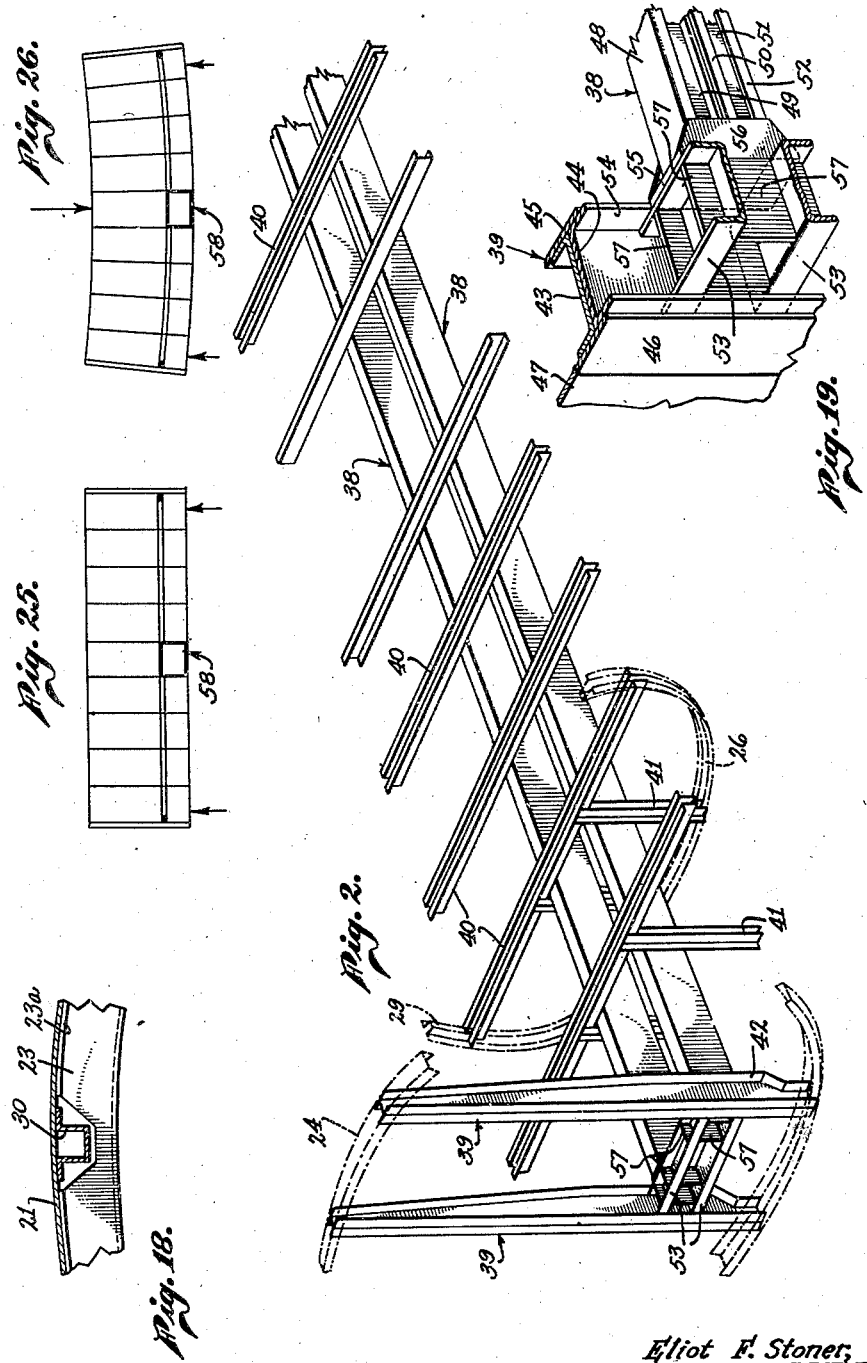

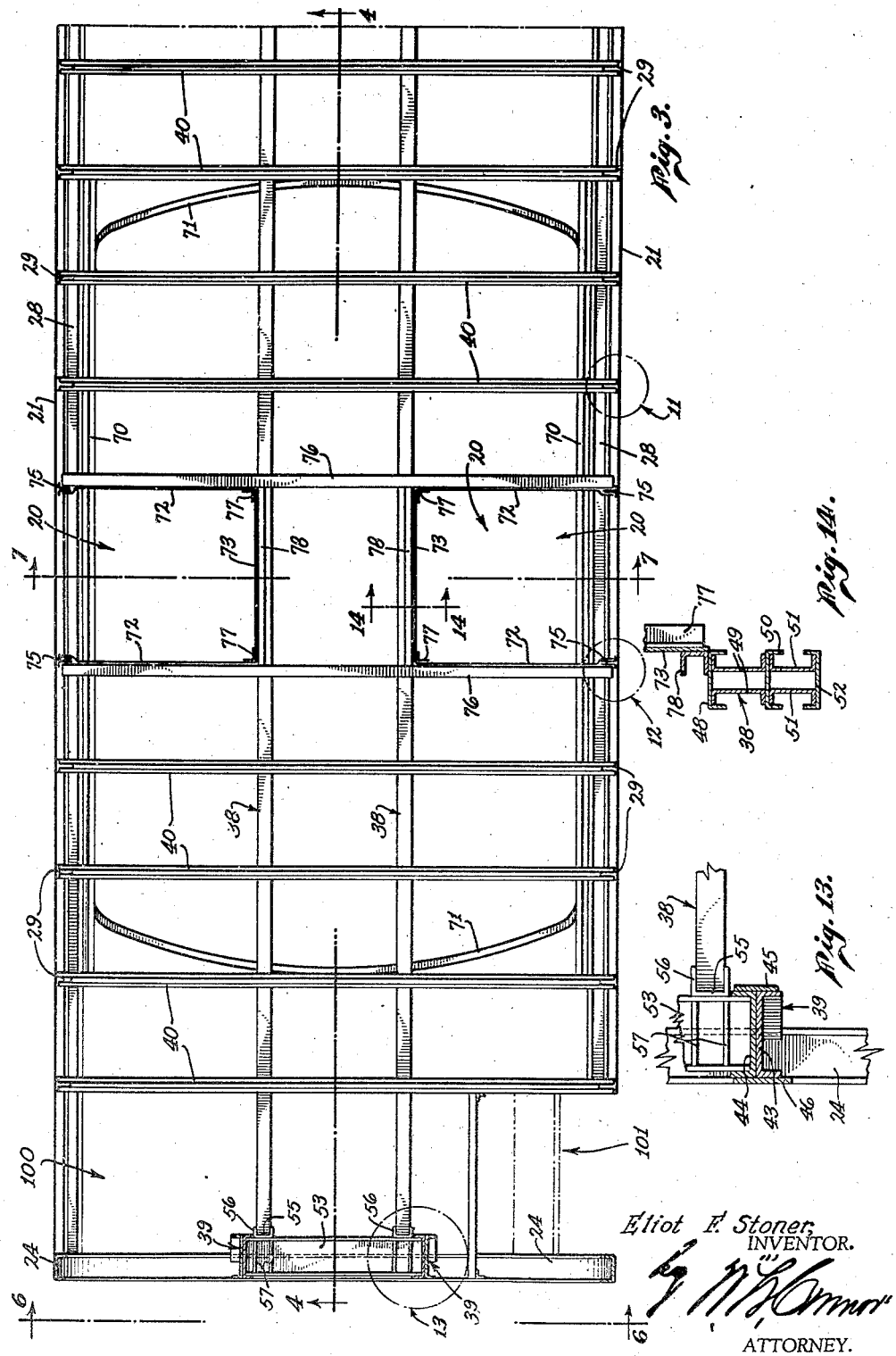

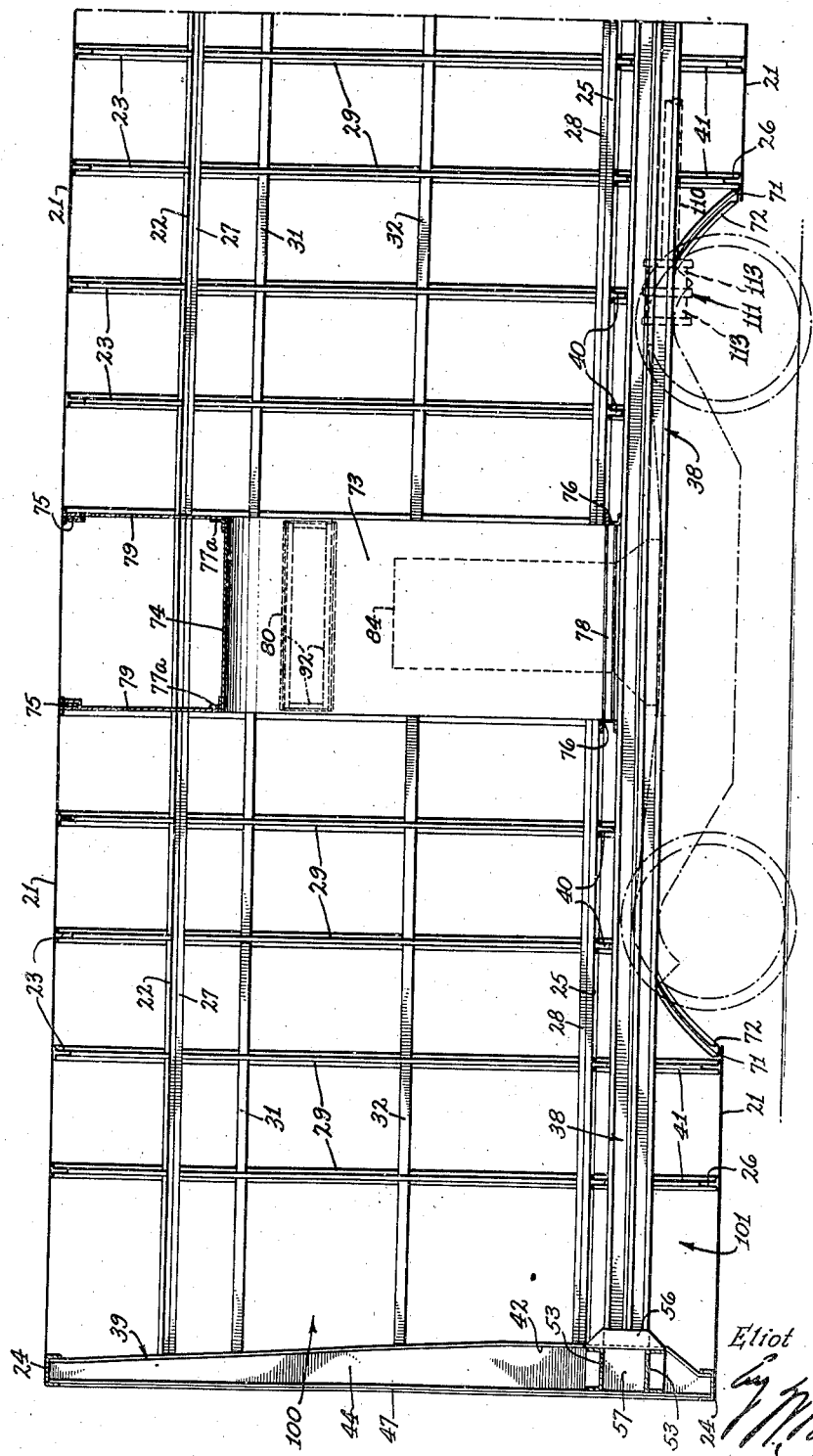

Dec. 3, 1940.   E. F. STONER   2,223,746
VEHICLE BODY CONSTRUCTION
Filed Sept. 3, 1938   9 Sheets-Sheet 5
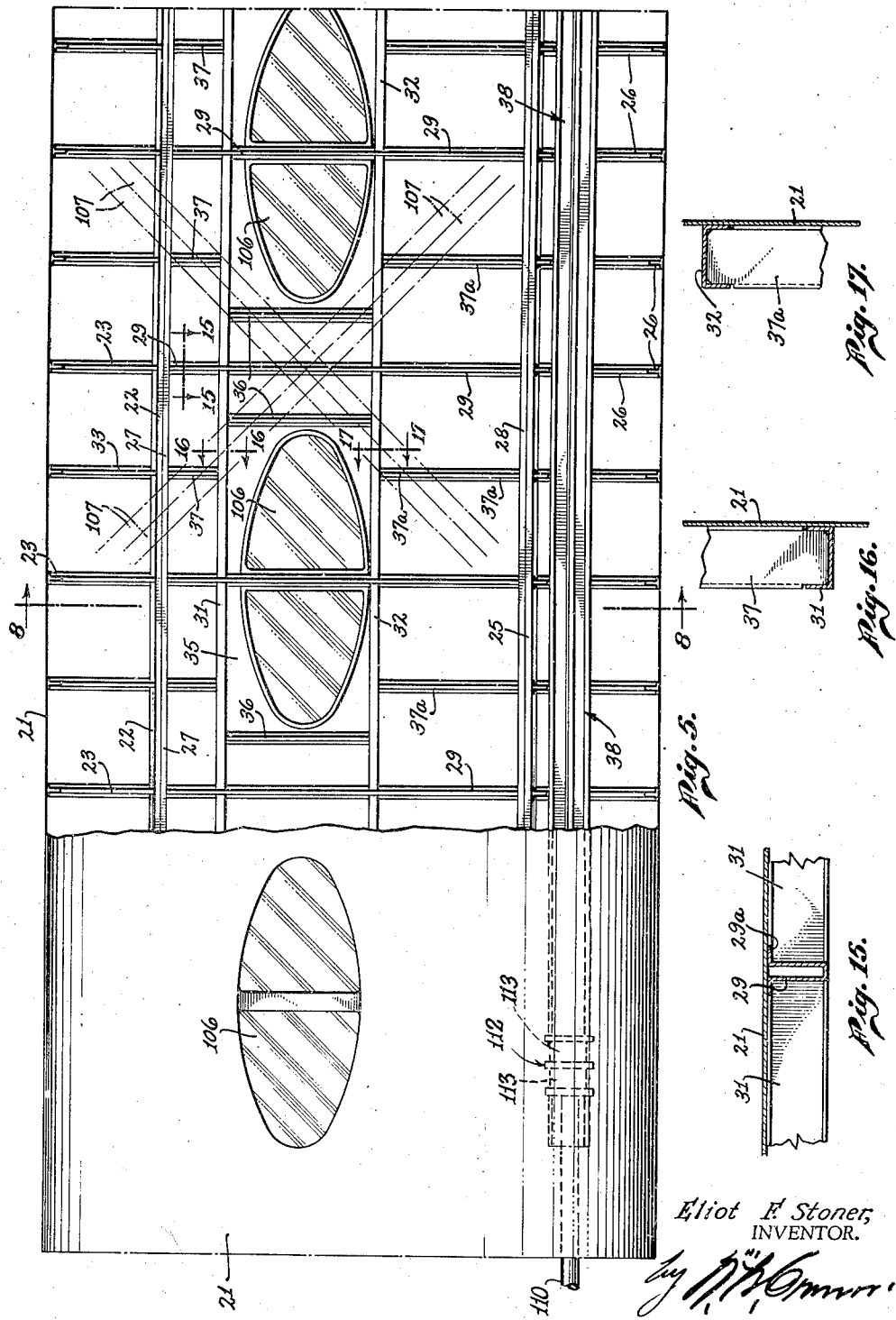
Eliot F. Stoner,
INVENTOR.
ATTORNEY.

Dec. 3, 1940.   E. F. STONER   2,223,746
VEHICLE BODY CONSTRUCTION
Filed Sept. 3, 1938   9 Sheets-Sheet 6

Eliot F. Stoner,
INVENTOR.
ATTORNEY.

Dec. 3, 1940.   E. F. STONER   2,223,746
VEHICLE BODY CONSTRUCTION
Filed Sept. 3, 1938   9 Sheets-Sheet 7
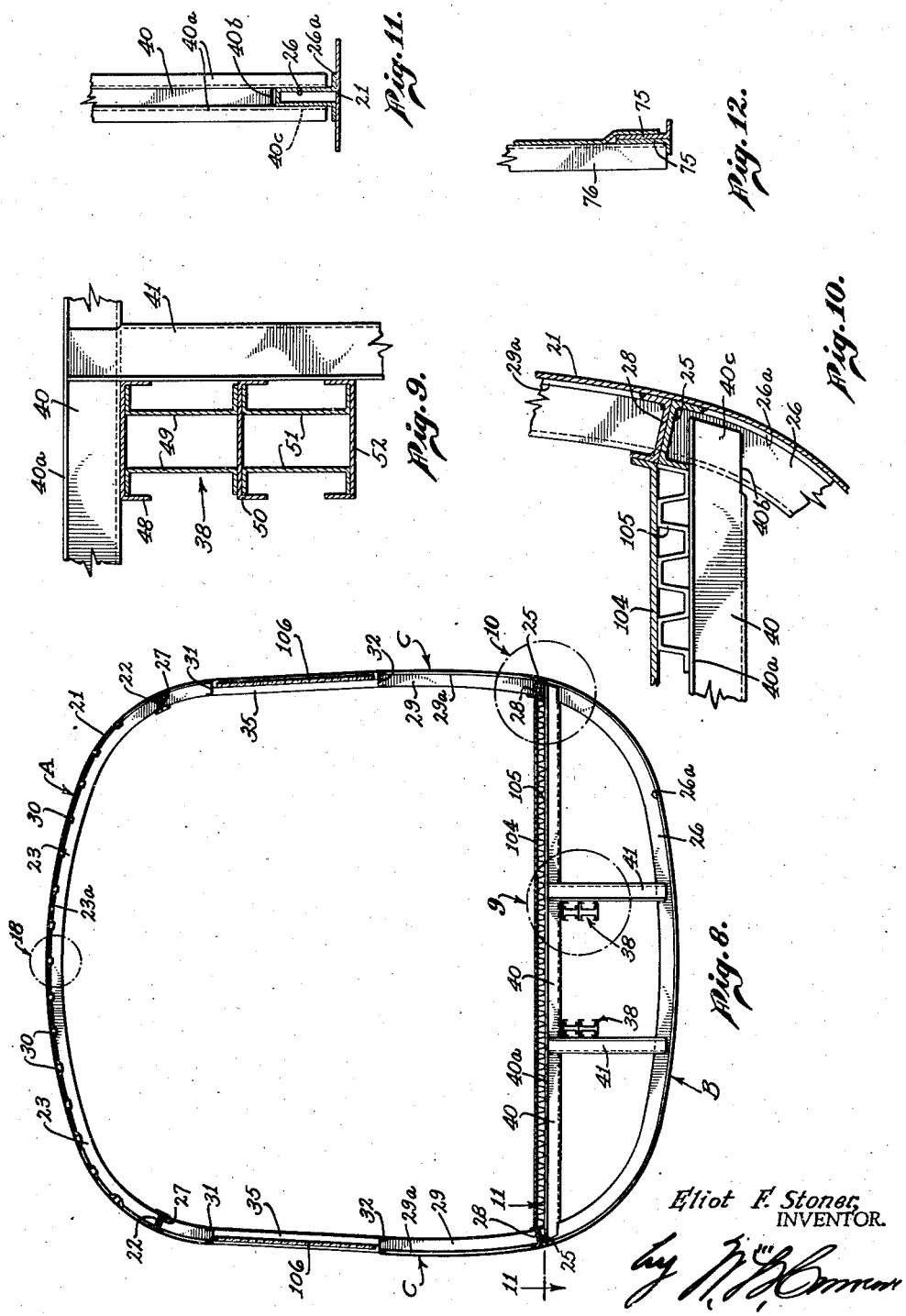
Eliot F. Stoner,
INVENTOR.
ATTORNEY.

Eliot F. Stoner, INVENTOR.

BY ATTORNEY.

Dec. 3, 1940.  E. F. STONER  2,223,746
VEHICLE BODY CONSTRUCTION
Filed Sept. 3, 1938   9 Sheets-Sheet 9

Inventor
Eliot F. Stoner,
By
Attorney

Patented Dec. 3, 1940

2,223,746

UNITED STATES PATENT OFFICE 2,223,746

VEHICLE BODY CONSTRUCTION

Eliot F. Stoner, Inglewood, Calif., assignor, by mesne assignments, to Pacific Railway Equipment Company, Los Angeles, Calif., a corporation of California Application September 3, 1938, Serial No. 228,311

22 Claims. (Cl. 105—399)

My invention relates to vehicles, with special reference to body construction, and is directed to a design of self-supporting body particularly applicable to high-speed, lightweight railway trains.

The present application may properly be considered as belonging with the following co-pending applications covering various aspects of a certain broad inventive concept of vehicle construction:

Application of William E. Van Dorn, Serial No. 43,692, filed October 5, 1935, entitled "Suspension system for vehicles;"

Application of William E. Van Dorn, Serial No. 87,698, filed June 27, 1936, entitled "Vehicle construction;" and Application of William E. Van Dorn and Paul K. Beemer, Serial No. 194,260, filed March 7, 1938, entitled "Suspension system for vehicles."

The broad inventive concept underlying these disclosures is discussed in full in the above listed applications and reference is made to them for the problems and principles of engineering involved in modern high-speed train design.

As part of this broad inventive concept, it was proposed to lower the body of a railway car to substantially below the usual level. An analysis of the present standard railway car reveals the following considerations as heretofore limiting any attempt to so lower the car body:

(1) Since uniformity of floor level is commonly regarded as fundamental, the floor must be of a height to clear the central pivotal supports of the two bogie trucks.

(2) Since the pivotal support point of a bogie truck is offset from the wheels of the truck, both laterally and longitudinally of the car, the pivotal point must be of sufficient elevation to accommodate a relatively heavy frame to distribute the load to the wheels.

(3) Since the car body is supported by a relatively heavy under frame, the floor of the car must be additionally elevated to provide for such frame, including structure for concentrating the load on the pivotal points of the two trucks.

In the foregoing disclosures, it has been shown that in the application of the broad concept to the construction of the car trucks, the first two of the above three considerations are completely avoided as limiting factors in the height of the car floor. The central pivotal supports of the bogie truck are eliminated by supporting the car body at laterally spaced points above the floor level. One purpose of the present invention, considered as part of the broader concept, is to avoid the third limiting factor in the height of a car body by eliminating the usual underlying frame and making the car body self-supporting. In achieving this purpose I also accomplish the further general object of lightening the car while increasing the strength of the body proper.

A general object of this invention is to design the body shell of a car to meet all the loads and all the forces normally imposed upon a car frame. It is not proposed simply to shift the car frame from its usual location below the floor; nor is it proposed to add a self-sufficient frame to the body shell. Rather, it is contemplated that the shell itself shall be adequate as a self-supporting hollow beam of exceptional depth and width, and that all forces and stresses shall be transmitted from the various fittings to the shell.

In utilizing the shell of the car in the contemplated manner, certain auxiliary members and fittings are supplied for the following functions:

(1) To stiffen the shell;
(2) To provide reinforcement at openings such as windows and doors;
(3) To transmit and distribute stresses from the trucks to the shell, and vice versa;
(4) To support a central column construction adapted to independently take the longitudinal forces of buff and draft; and
(5) To transmit draft forces at both ends of the car. These forces must be distributed to the shell from draft members and conversely transmitted from the shell to the draft members.

A further object of my invention is to provide a novel, efficient, and light-weight system of members and fittings for such functions, which cooperate with the shell and which are structurally sufficient but not redundant.

It is my purpose that the car as a whole shall include, in combination, a primary structure of substantially uniform cross-sectional configuration from end to end and a secondary structure cooperating therewith, both of which are free from structurally dead material.

By the term primary structure I mean the outer covering or skin, longitudinal stiffeners attaching thereto and transverse reinforcing rings or girth members; the whole forming a unitary structure acting as a beam carrying all the normal vertical and lateral loads imposed upon the car body in service.

By secondary structure I mean additional and, to certain specified extents, independent longitudinal structural members forming an internal end load column. This column is connected with and laterally stabilized in the primary structure by certain connecting structures which may be regarded as parts of either structure or as mere connecting or load distributing media.

The functions of the primary and secondary structures are definite in that the primary structure resists vertical and lateral loads while the secondary structure resists longitudinal loads in normal service and collision. The secondary structure is attached to the primary structure in such a way that the normal load carrying function of the primary structure is not altered.

The use of a skin-stressed structure permits the use of a uniform cross-sectional configuration from end to end, which has finite radius of curvature at all points as distinguished from a body structure in which the side panels are truss members, necessarily plane, to which an outer skin is loosely attached.

A further advantage of a skin-stressed structure of the design I employ is that the car body so constructed has a high degree of torsional rigidity.

The fact that windows weaken the shell is unavoidable. An important object of my invention, however, is to minimize the penalty of window openings by cutting the openings to a novel shape that does not unduly restrict the range of vision of passengers.

For the purpose of illustrating the principles of my invention, the present disclosure is directed specifically to a body construction for the novel body-suspension systems disclosed in the aforementioned co-pending applications, but those skilled in the art will appreciate that the same construction may as readily be adapted to a body mounted on the conventional bogie trucks; and moreover, may be applied with equal facility to vehicles outside the field of railroad engineering.

The above and other objects and advantages of my invention will be apparent in the following detailed description taken with the following drawings, in which drawings:

Fig. 1 is a fragmentary perspective view, showing the construction of the primary structure at one end of the car body.

Fig. 2 is a fragmentary perspective view, showing the construction of the secondary structure at the end of the car body, corresponding to Fig. 1.

Fig. 3 is a sectional view, taken as indicated by the line 3—3 of Fig. 6, showing a portion of the structure corresponding to Figs. 1 and 2.

Fig. 4 is a central vertical sectional view, taken as indicated by the line 4—4 of Fig. 3, showing a portion of the structure corresponding to Figs. 1, 2 and 3.

Fig. 5 is a fragmentary view, partly in side elevation and partly in central vertical section, showing the structure intermediate the ends of the car.

Fig. 8 is a transverse sectional view, taken as indicated by the line 8—8 of Fig. 5.

Fig. 9 is an enlarged fragmentary detail view, taken as indicated by the dotted circle 9 of Fig. 8.

Fig. 10 is a similar view, taken as indicated by the dotted circle 10 of Fig. 8.

Fig. 11 is an enlarged fragmentary sectional view, taken as indicated by the line 11—11 of Fig. 8, and the dotted circle 11 of Fig. 3.

Fig. 12 is an enlarged fragmentary sectional view, taken as indicated by the dotted circle 12 of Fig. 3.

Fig. 13 is an enlarged fragmentary sectional view, taken as indicated by the dotted circle 13 of Fig. 3.

Fig. 14 is an enlarged fragmentary sectional view, taken as indicated by the line 14—14 of Fig. 3.

Fig. 15 is an enlarged fragmentary sectional view, taken as indicated by the line 15—15 of Fig. 5.

Fig. 16 is an enlarged fragmentary sectional view, taken as indicated by the line 16—16 of Fig. 5.

Fig. 17 is an enlarged fragmentary sectional view, taken as indicated by the line 17—17 of Fig. 5.

Fig. 18 (Sheet 2) is an enlarged fragmentary sectional view, taken as indicated by the dotted circle 18 of Fig. 8.

Fig. 19 (Sheet 2) is an enlarged fragmentary perspective view of the structure shown in Fig. 13.

Fig. 23a is a view similar to Fig. 23 but taken on a plane away from the center of the car, showing the manner in which the end load beams may be tied to the primary structure at places other than the center.

Fig. 25 (Sheet 2) is a diagrammatical view showing the positions of the various members comprising the primary and secondary structures under normal load.

Fig. 26 (Sheet 2) is a similar view, showing the relative positions of the members, to an exaggerated extent, under a bending load.

Figure 7:
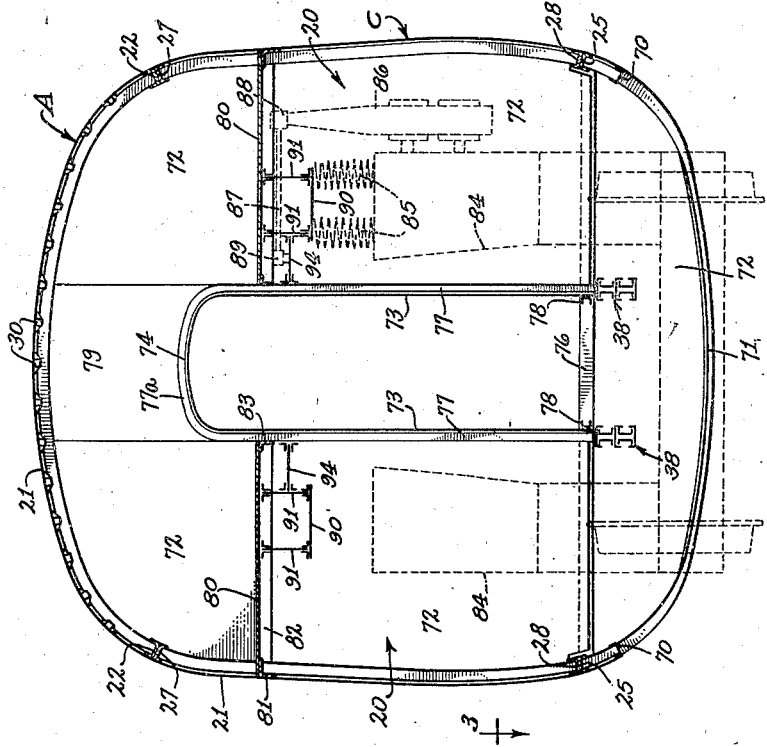
Fig. 7 is a transverse sectional view, taken as indicated by the line 7—7 of Fig. 3.

In the construction of a railway car for an articulated train of the type disclosed in the aforementioned co-pending applications, the car body is built with four truck compartments, indicated by numerals 20 in Fig. 3, whereby the body may be supported at four spaced points by truck or wheel unit members extending upward into the truck compartments, preferably to levels at or above the center of gravity of the body. A further feature peculiar to the particular construction here considered is that draft forces are transmitted from the trucks to the car body, and vice versa, by means independent of the body-supporting means, such draft connections being members extending from each truck towards the center of the car, connecting each truck with the bottom of the car. It is contemplated, moreover, that draft forces between cars may be transmitted from wheel unit to wheel unit instead of from body to body, as shown in the aforementioned co-pending application, Serial No. 194,260. A teaching of how the principles of the present invention are applied to these particular requirements will instruct those skilled in the art how the invention may be applied to other construction; for example, constructions in which the body is supported at two centrally aligned points and in which the draft forces are transmitted in the conventional manner.

The car body is substantially ovate in cross-sectional configuration to provide curved transitions from the roof to the sides, and from the sides to the bottom, the shape being defined by an outer sheet-metal shell 21 of suitable material, preferably a steel alloy. The widest dimension of the body is above the floor level, preferably at about the seat level.

In the stiffening structure it is my intention to utilize, as far as possible, a combination of extruded or rolled channel members and members having a U-shaped cross-sectional configuration, which, for convenience, I will term "hat sections." It is also my intention to join all members by welding, although other securing means may be used if desired.

For convenience of manufacture and assembly, I prefer to construct the body, or what I have termed the primary structure, in four longitudinally continuous sections, comprising a top section A, bottom section B, and interconnecting side sections C, although other forms may be adopted without departing from the broad principles of my invention.

Inasmuch as the details of construction of each end of the car body, as well as the intermediate portions, are identical, but one end and one intermediate portion will be described.

A relatively light sheet-metal shell of the shape indicated will be adequate to carry all loads so long as it retains its shape, but may not be stiff enough to retain its shape under extreme service conditions. Considerable saving in weight may be had, however, by using a relatively light shell together with suitable means to stiffen the shell. Further weight reduction may be had, as taught by my invention, by using, in several instances, the same means for stress distribution to the shell that is used for stiffening the shell. The problem is to provide such means subservient to the shell with minimum weight and maximum efficiency. These considerations are to be kept in mind for a proper understanding of the further details of my construction.

The top section A is formed of channel members 22, which extend throughout the length of the body, a plurality of longitudinally spaced arcuate ribs 23 secured therebetween, and a plurality of laterally spaced longitudinal stiffening members 30. Channels 22 terminate by connection with channel shaped reinforcing rings 24 at each end of the shell 21.

The bottom section B is formed of channel members 25 and a plurality of longitudinally spaced ribs 26 secured therebetween, in vertical alignment with ribs 23. Channels 25 also extend the full length of the shell and terminate by connection with reinforcing rings 24, except where they are terminated at the doorways, which will be later described.

The side sections C are formed of upper channels 27, arranged in back-to-back relation with channels 22 and bottom channels 28, arranged in back-to-back relation with channels 25, and a plurality of ribs 29 secured therebetween in vertical alignment with ribs 23 and 26 of the sections A and B.

The ribs 23, 26 and 29 are of the "hat section" type and are secured to their respective channels 22, 25, 27 and 28 with their flanges 23a, 26a, and 29a facing outwardly in the manner shown in Figs. 10 and 11 (Sheet 7). The rib flanges are cut away so the ends of the ribs may be extended between the channel flanges and secured thereto, so the outer surfaces of the rib flanges will be flush with the outer surfaces of the outer channel flanges as shown in Fig. 10.

The outer shell 21 is welded to the outer faces of the rib flanges 23a, 26a and 29a, to the longitudinal stiffening members 30, to the end rings 24, and to the outer faces of the outer flanges of channels 22, 25, 27, and 28. As the shell 21 is applied last, it need not be terminated along the lines of the joints formed by the channels 22 and 27, and 25 and 28.

After the structure is fabricated; that is, after the channels 22 and 27 and 25 and 28 have been properly joined together, the aligned ribs 23, 26 and 29 will form, in effect, continuous rings or girth members, extending around the inner surface of the shell, reinforced and held in longitudinally spaced relation by the pairs of channels 22 and 27 and 25 and 28. The ribs may be made in the form of continuous rings or girth members—as that is the result desired—and the channels 22, 25, 27 and 28 extended between and secured to them, but for economy of manufacture and ease of assembly the above described construction is deemed preferable.

To stiffen the shell longitudinally, where it will be in compression, I employ a plurality of light weight "hat section" stiffening members 30. These members distributed, for example, as shown in Figs. 1, 7 and 8, extend continuously along and are secured to the top of the shell (section A), in the manner shown in Fig. 18 (Sheet 2). They are terminated by abutment against, but have no connection with, the reinforcing rings 24 at the ends of the shell 21. The stiffeners 30 are intended to function entirely independently of the girth members and for this purpose the ribs 23 are cut away to accommodate them as shown in Fig. 18. If found desirable, similar stiffeners may be likewise extended along the bottom of the shell through ribs 26.

For the purpose of compensating for the weakening of the shell 21 by cutting window openings in the sections C, as well as for the further purpose of increasing the resistance to lateral load and of stabilizing the various girth members, suitable longitudinal web members, in the form of channels, interconnect the various girth members throughout the length of the car. These longitudinal web members preferably comprise upper channels 31 and lower channels 32.

The manner in which these longitudinal channels are connected to the girth members through ribs 29 is indicated in Figs. 5, 15, 16 and 17. Where both the channels 31 and 32 connect with the ribs 29, their outer flanges are cut away to accommodate the flanges 29a so the outer surface of the outer flange will be flush with the outer surfaces of the flanges 29a, as shown in Fig. 15.

Intermediate the ribs 23 in the top section A are ribs 33 which are, for all intents and purposes, like ribs 23 and also in the bottom section B are ribs 34, in vertical alignment with ribs 33, which are, for all intents and purposes, like ribs 26.

Fore and aft of the ribs 29 are window panels 35, formed by adding vertical ribs 36 interconnecting the channels 31 and 32 in the manner shown in Figs. 5, 16 and 17. Above the window panel 35 are short ribs 37 interconnecting channels 27 and 31 in the manner shown in Figs. 16 and 17. These are also of the "hat section" type and are in vertical alignment with ribs 33. Below the window panel 35 are hat section ribs 37a likewise interconnecting channels 32 and 28 in vertical alignment with ribs 33 and 37.

Figure 6:
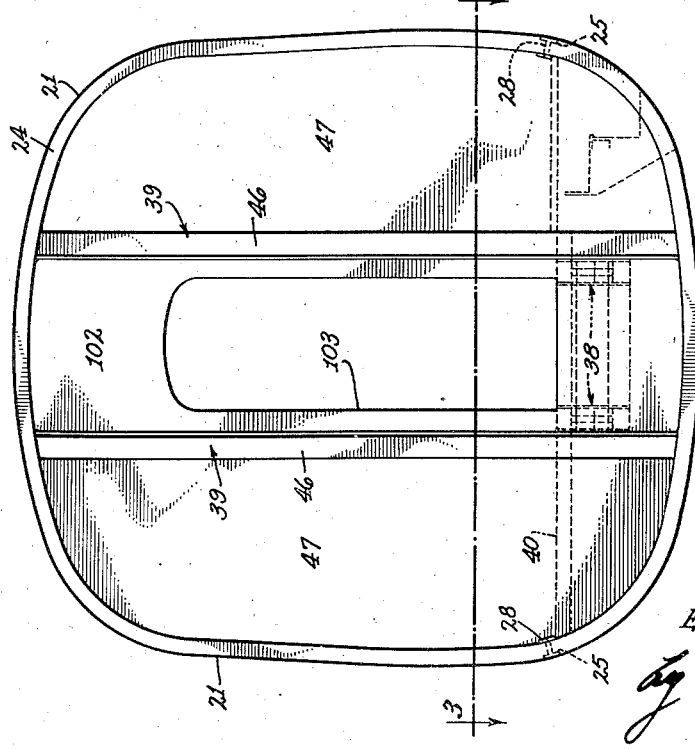
Fig. 6 is a view showing the end of the car as indicated by the line 6—6 of Fig. 3.
Figure 21:
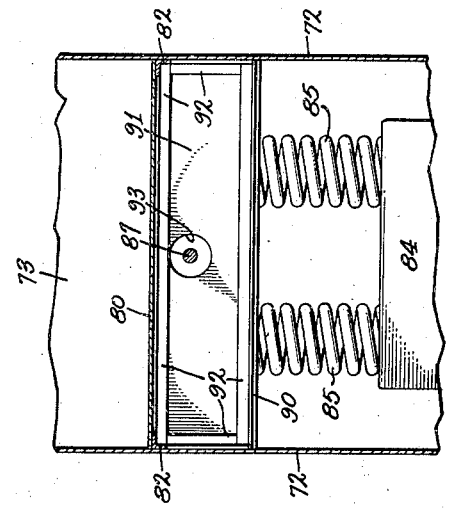
Fig. 21 is a sectional view, taken as indicated by the line 21—21 of Fig. 20.
Figure 22:
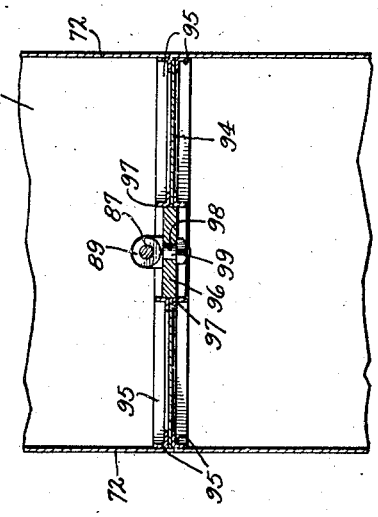
Fig. 22 is a sectional view, taken as indicated by the line 22—22 of Fig. 20.

The secondary structure, as illustrated in Fig. 2, consists primarily of a longitudinal end load column composed of a pair of parallel members, generally designated by the numeral 38. End posts 39 form a part of the secondary structure and also a connection between that structure and the primary structure shell. Floor supporting members 40 and 41 are part of the primary structure as regards vertical load support and also form an interconnection between the primary shell and secondary end load column to stabilize the column laterally and to carry it. End posts 39 are secured at their upper and lower ends between the flanges of the end reinforcing rings 24 and are widened adjacent their lower ends near their connection with the end load column 38, as at 42, to afford added resistance to end loads and to resist shock. These posts are preferably formed of two channel members 43 and 44, placed back-to-back and secured together by reinforcing plates 45 and 46; plates 46 being offset towards the outside of the car to facilitate securing of end closure sheets 47, as shown in Figs. 6 and 19.

As will be explained more fully later, the interconnection of the column members 38 with end posts 39 is such that end loads are transmitted effectively between them; but the interconnection between the column members and the primary shell, via the end posts, is of such nature that the column does not to any substantial degree perform any function as a tension member in the lower part of the primary body, thus leaving the normal load carrying functions of the primary body unaltered.

To combine adequate strength with light weight, the end load beams are formed as shown in Figs. 9 and 14. Preferably they consist of a top inverted channel 48, into which a pair of channels 49 are set in laterally spaced and back-to-back relation; a second inverted channel 50 supporting channels 49; a second pair of channels 51 set into the channel 50 in the manner of channels 49, and a channel 52 receiving the bottom flanges of channels 51 between its upturned flanges. Beams 38 are continuous from end to end of the car between end posts 39.

Beams 38 are secured to posts 39 in the manner best shown in Figs. 13 and 19. Vertically spaced channels 53 are secured between the inner opposed flanges 54 of the post channels 44, in back-to-back relation. End shoes 55, having flanges 56 adapted to receive the ends of the beams 38 therebetween, span the space between and are secured to the inner flanges of channels 53. Reinforcing plates 57 may be provided between the channels 53 and their flanges, in alignment with the flanges of channels 48, 50 and 52, as best shown in Fig. 19.

The members 40 are of the "hat section" type and are secured across the body between the upturned ends of ribs 26, passing over beams 38, with their lateral flanges 40a facing upwardly, in the manner illustrated in Figs. 2, 8, 10 and 11.

While the members 40 may be connected to the beams 38 for the purpose of providing lateral stability to the latter, they pass over the beams in the sense that they are not vertically supported by them. The members 41 vertically interconnect the members 40 and ribs 26 in the manner shown in Figs. 8 and 9. By such interconnection with and support by the primary structure shell, the floor beams 40 become a part of the primary structure that carries the vertical and lateral loads independently of the secondary end load column. As stated before, the primary structure is designed to carry those loads independently of the secondary column; and the secondary column is carried and supported by the shell structure rather than vice versa. Thus, where the floor beams 40 are attached to the column 38 they laterally stabilize the latter and support it but are not supported by it. The same is true of the connections of the column 38 to the end posts.

The interconnection of one "hat section" member with another is most conveniently accomplished by cutting away the web portion 40b to the depth of the U-shaped portion of the connected member, leaving the side portions 40c and flanges 40a, which are extended over said portion of the connected member and suitably welded in place, as shown in Figs. 10 and 11.

The members 40 and 41 are only intended to take vertical and lateral loads. It is not intended that these members be of such weight as to have lateral rigidity; that is, rigidity longitudinally of the car body. Their principal functions are, in addition to taking vertical and lateral loads, to laterally stabilize the end load beams 38 in such a manner that the secondary structure consisting of the beams 38 and end posts 39 take all of the end loads and shocks independently of the shell or primary structure. The end load beams may extend and contract longitudinally independently of the primary structure. The members 40 and 41 are designed to yield in a direction longitudinally of the primary structure to permit the beams 38 to conform freely to the load deflection curve of the primary structure as diagrammatically illustrated in Figs. 25 and 26, without placing on the beams 38 any substantial longitudinal tension. For this purpose beams 38 are preferably secured to both the members 40 and 41. Fig. 23a shows at 69a how the end load beams 38 may be attached, as by welding, to columns 41; and at 69b to columns 41 and beams 40.

The beams 38, by reason of their attachments to end posts 39 and also by reason of their being laterally stabilized by the members 40 and 41 constitute, in effect, a column within and extending continuously along the bottom portion of the primary structure, to receive end loads of buff and draft independently of the primary structure.

Figure 23:
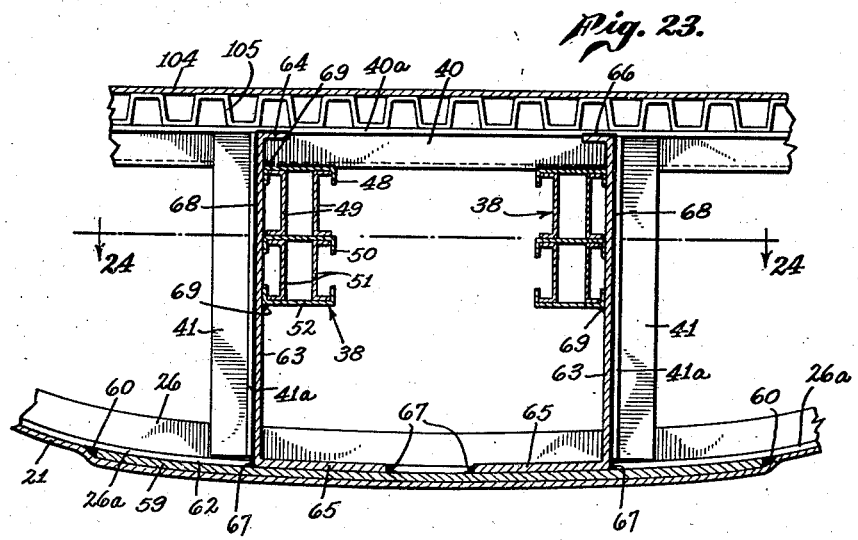
Fig. 23 is a fragmentary transverse vertical sectional view, taken between two girth members at the center of the car body, showing the manner in which the end load beams may be tied to the primary structure to distribute the end loads over a limited area of the shell.
Figure 24:
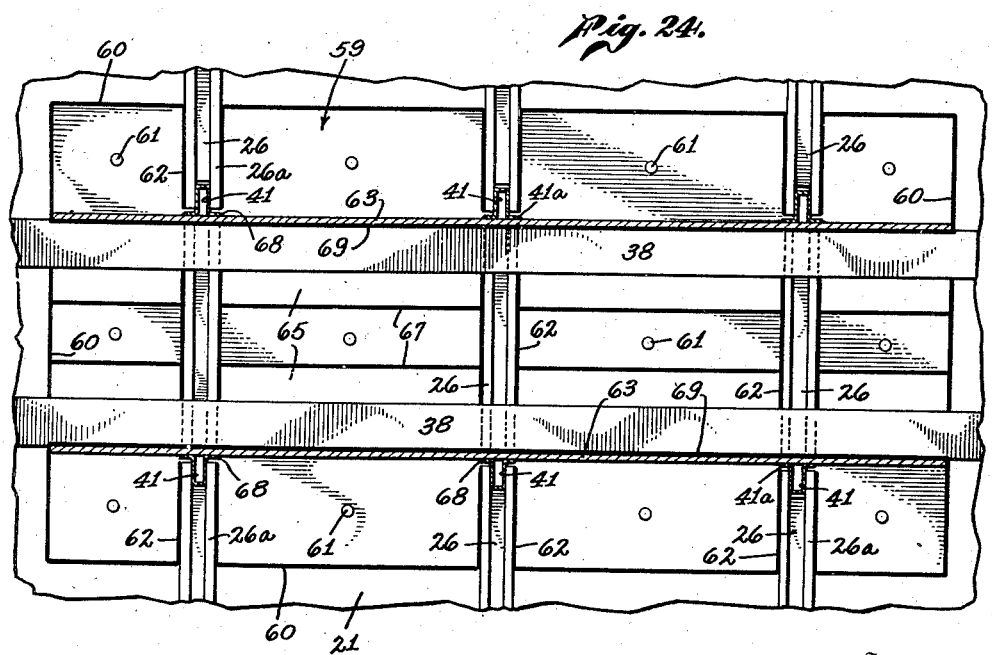
Fig. 24 is a fragmentary sectional plan view, taken as indicated by the line 24—24 of Fig. 23.

Other than being secured to the end posts 39 and to members 40 and 41, beams 38 are entirely independent of the primary structure except for an inertia load attachment to the shell at the center of the car, as generally designated by the numeral 58 in Figs. 25 and 26, and as more particularly illustrated in Figs. 23 and 24.

Referring now to Figs. 23 and 24: For the purpose of rigidly securing the beams 38 to the shell, at a point approximately at the longitudinal center of the car, I first provide a relatively heavy reinforcing and load distributing plate 59, proportioned to extend over a limited area of the shell 21 and be suitably secured thereto, as for instance, by welding, as indicated by the heavy marginal lines 60. If desired, this plate may be further secured to the shell by spot welding, as indicated by the circles 61. Preferably plate 59 will be large enough to span several of the ribs 26, and to extend laterally beyond the members 41, as shown in Fig. 24. It will also preferably be secured to the rib flanges 26a by welding, as indicated by the heavy lines 62 in Figs. 23 and 24.

Plates 63, proportioned to extend throughout the length of plate 59, extend vertically between plate 59 and beams 40, and are located between the inner flanges 41a of members 41 and the outer flanges of channels 48, 50 and 52, which make up the end load beams 38. They are turned along their horizontal edges to provide top flanges 64 and relatively wide bottom flanges 65, both plates 63 and flanges 64 and 65 being cut away to conform to the cross-sectional areas of the ribs 26 and the members 40. The top flanges 64 are secured to the flanges 40a of members 40 by welding as indicated by the heavy lines 66, and the bottom flanges 65 are secured to the plate 59 and flanges 26a of ribs 26 by welding, as indicated by the heavy lines 67. Plates 63 are secured to the flanges 41a of the members 41 as indicated by the heavy lines 68 and channels 48 and 52 of beams 38 may be secured thereto by welding, as indicated by the heavy lines 69.

The above described construction provides a rigid box-like connection between the end load beams and the shell, whereby end loads are received and transmitted to the shell without in any way interfering with the general, relative flexibility between the beams and shell when under bending load as shown in Fig. 26.

To provide suitable clearance for the truck frame, the ribs 26 and members 41 are eliminated fore and aft of the truck recesses 20, as shown in Figs. 4 and 7, and the outer shell 21 is correspondingly cut away. To provide marginal reinforcements for the edges of the shell which extend along the truck recesses, channels 70 are secured between the first rib 26 on each side of the recesses and the shell secured to their outer flanges. Additional channel members 71, secured at their ends to channels 70, are provided to reinforce the marginal edges of these portions of the shell 21 which extend across the truck recesses as shown in Figs. 3, 4 and 7. Closure sheets 72 may be provided to extend over the areas between the channels 71 and members 40.

The truck recesses 20 are defined by sheets 72 and 73; sheets 73, together with a top sheet 74, forming a central passage between the recesses. Instead of ribs 23 and 29 of the "hat section" type, a pair of angle members 75, placed back-to-back, are used. (See Fig. 12.) These members are joined to the longitudinals 22, 27 and 28 in the manner previously described and are connected across their bottom ends by channels 76, which are of the same depth as members 40, and pass over the beams 38, as shown in Fig. 3. Sheets 72 are secured along their bottom edges to channels 76 and along their side and top edges to the angles 75, as shown in Fig. 12. Angles 77 may be provided to reinforce the inner corners formed by the junctures of the sheets 72 and 73, and these may be carried over as reinforcements to sheet 74 as indicated by 77a. The bottom edges of the inner sheets 73 are joined to auxiliary channels 78, which rest upon and are secured to beams 38. The top edges, as previously stated, are joined by the arcuate sheet 74 and filler sheets 79 may be provided to interconnect the inner edges of sheets 72 and sheet 74, through angles 77a, and the angles 75 extending across the top of section A.

Figure 20:
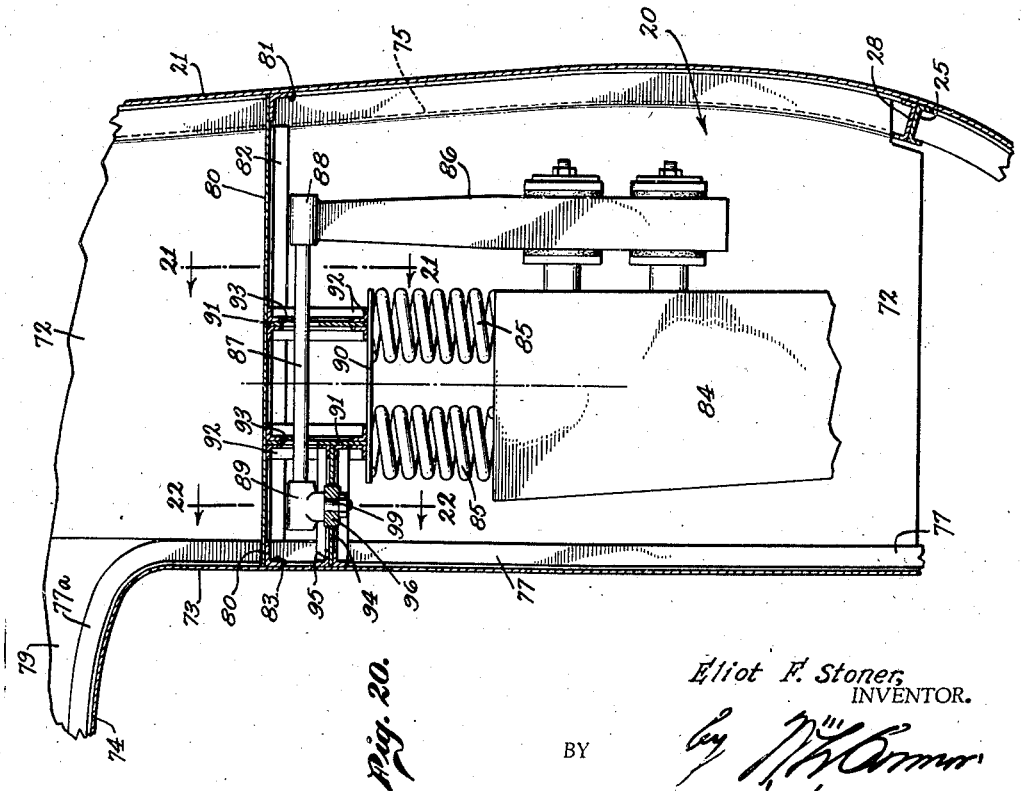
Fig. 20 is an enlarged fragmentary sectional view through one of the truck compartments, showing the manner in which the car body is supported upon the trucks.

The tops of the truck recesses are closed by sheets 80 (Figs. 7 and 20) which are secured to the outer shell 21 by suitable angles 81 and to the sheets 72 and 73 by angles 82 and 83, respectively.

Preferably the type of truck that will be used with a car body of the foregoing description is that shown in the aforementioned co-pending application, Serial No. 194,260, although other types may be used, if desired, without departing from the principles of my invention.

A truck of the type mentioned has towers 84 extending upwardly from the truck frame proper into the truck recesses 20, upon which are supported relatively long, light-weight, helical springs 85. Lateral stabilizers or cushioning members are provided, in the form of arms 86, yieldingly mounted on the towers to have limited, relative movement laterally of the car body and connecting rods 87, connected at their outer ends to the upper ends of arms 86, through the medium of universal joints 88, and being adapted to be connected to the car body at their inner ends through the medium of universal joints 89.

The car body rests upon springs 85 through the medium of supporting plates 90, extending longitudinally of the truck recesses 20, which plates are connected to the sheets 72 and 80 by means of shear plates 91 and suitable angles 92. Plates 91 have apertures 93 therethrough to permit free movement of connecting rods 87.

Plates 94 are connected between inner shear plates 91 and sheet 73 by means of angles 95, to provide means for connecting the inner ends of connecting rods 87 to the car body. For this purpose relatively heavy bearing plates 96 are secured centrally of plates 94 by means of angles 97 in which are central apertures 98 to receive studs 99 of universal joints 89.

The action of the above described members in supporting and controlling movements of the car body is fully described in the said co-pending application Serial No. 194,260, and reference is made to that case for more complete detail.

In effect the sheets 72 constitute bulkheads through which loads are transmitted from the trucks and sheets 80 to the shell and vice versa.

Due to the fact that the lower part of the body shell is interrupted as explained at the truck recesses, allowing more longitudinal compression at that point in the lower part of the body than would otherwise be so; and due to the fact that the end load column 38 is connected at its ends to the ends of the body shell via a structure that transmits endwise stresses as a beam and with beam deflection (the beams 53 and end posts 39); no substantial part of the forces of extension to which the lower part of the body shell is subjected in its load carrying action are transmitted to the end load column. The end load column is consequently normally substantially unstressed longitudinally and is free to take, directly and independently of the body, all the longitudinal draft and similar forces and all longitudinal forces of buff and shock which are transmitted to it directly by and from the end structure.

Vestibules are provided, at the ends of the car, as generally designated by the numeral 100 and door openings, preferably on only one side of the car, as indicated by the numeral 101.

Longitudinal reinforcing members 25 and 28 are terminated by connection with the first ribs 26 and 29 from the ends of the cars, to allow for the door openings. Any suitable step construction may be used which will not only serve its purpose but also compensate for termination of the members 25 and 28 between the first ribs 26 and 29 and the end reinforcing channels 24.

A sheet 102 is provided as a closure between end posts 39 in which there is a door opening 103 for inter-car passage.

The floor, as best shown in Fig. 8, may be made up of metal sheets 104, reinforced by underlying corrugated sheets 105. These members are supported upon members 40 and may be secured in any suitable manner which will not interfere with the functions of the primary and secondary structures.

A feature of my invention is the conception that the weakening of the shell of a skin-stressed body caused by cutting window openings may be minimized by cutting each of the openings to a configuration that is relatively narrow in vertical dimension at the end nearest the corresponding passenger seat and widened progressively towards the end away from the normal position of the passenger. For example, windows of elliptical character may be employed, as shown at 106 in Fig. 5, without seriously impairing visibility, since an ellipse of proper configuration appears circular when viewed at an oblique angle.

While I do not restrict myself to windows of elliptical or like configuration, I do recognize the advantage of using such windows. The advantage may be readily understood by considering the skin or shell between two pairs of windows as constituting two straps inclined at an angle of 45°, such straps being indicated by the dot-dash lines 107 of Fig. 5. It is apparent at a glance that these imaginary straps would be considerably reduced, if not entirely eliminated, if rectangular windows, equal in their principal dimensions to windows 106, were employed.

With my construction it is contemplated that the draft forces be transmitted through a suitable, semi-flexible draw-bar connected at one end to the end load beams and at its opposite end to the truck frame, the draft forces between adjacent car bodies being transmitted either through the truck frames or through suitable couplings between cars. Figs. 4, 5 and 7 show such a flexible draw bar 110 semi-flexibly connected at 111 to the truck and at 112 to the end load column 38. The structure here shown follows that of the Van Dorn and Beemer application, Ser. No. 194,260. Rubber washers or pads 113 are used at the connection points for flexibility.

By constructing the shell of the car as a unitary hollow beam, I provide a car body that is exceptionally light yet exceptionally rigid and resistant to torsional strains. The car body is supported at the four spaced truck compartments 20, and the bulkhead structures provide for efficient distribution of load from those compartments to the shell or skin of the car. The draft forces are transmitted to the car body through the beams 38, and are efficiently distributed by virtue of the various reinforcing members of the primary structure.

The various girth members are interconnected by horizontal shear members in the region of the windows, by the floor supporting members of the car and by the longitudinal members 22, 27, 25 and 28, so that these girth members are stabilized through the skin and loads are distributed among the girth members; yet these interrelated members for distributing loads do not, strictly speaking, constitute a frame in the sense of a load-bearing system, because the organization of the distribution member is purposely too flexible to take the load off the body shell. The joints described are employed because of their relative flexibility, and the end load beams are purposely not directly connected to each of the girth members in a manner to introduce rigidity in the internal organization of stress members. The end load beams, together with the end posts and the manner of attachment to the girth members, constitute what may be termed an internal column, extending from end to end of the car body, designed to take end loads independently of the outer shell. In other words, a column within a column, but each independent of the other insofar as load carrying functions are concerned.

It is apparent that a certain unity is achieved. The shell supports all the normal vertical and lateral load, the internal organization of stress-distributing members being subservient to that purpose. In fact, the whole body may be regarded as a skin-structure, the term being defined as comprehending the skin and its associated transverse and longitudinal members considered as a composite unit. Each element in the organization is tied in with all related elements for a definite purpose, and each element depends upon its associated elements for its own function.

While I am inclined to refer to the shell of the car as "tubular" and term the girth members "rings," it is apparent that my car is not cylindrical in cross-section. Rather, the configuration is one that evolves logically from elementary considerations and the modern requirements of minimum weight and at least sufficient "streamlining" to provide pleasing transitions between convergent surfaces. Thus, that substantial width at the seat levels and lesser width for head room are required for passenger comfort is elementary, and it follows that for economy of material the roof of the car will be narrower than the car as measured at the seat level. For economy and strength the roof will be curved to meet the inclined sides of the car, and below the seat level the sides and bottom will curve into each other. Finally, with the above configuration elements, a pleasing design may obviously be completed by rounding the bottom of the car to "balance" the arched roof. The completed configuration may be described as a body having inwardly inclined sides, a rounded roof, and a rounded bottom with arcuate transitions from the roof to the sides, and arcuate transitions of greater radii from the sides to the bottom. The greater radii of the transition curves at the lower part of the body are suggested by the requirement of maximum width at the seat level, at which point transition curves may be varied to achieve the pleasing design shown in the drawings.

While I have described a particular embodiment of my invention in specific detail, for the purpose of disclosure and to teach the principles involved to those skilled in the art, I do not restrict myself to such embodiment. It is apparent that a wide range of changes and modifications may be made without departing from my inventive concept, and I reserve the right to all such changes and modifications that come within the scope of my appended claims. In these claims the term "end load" used descriptively of the longitudinal column of the secondary structure is intended to describe a structure adapted to take end loads.

Having described my invention, I claim:

1. In a vehicle the combination of: a primary structure including a live load carrying shell; a secondary structure including an end load column within and extending continuously along the bottom portion of the primary structure; load distributing members connecting the ends of said column to the ends of the primary structure; a rigid connection between said column and the primary structure at substantially their longitudinal centers, said column being not otherwise secured to the primary structure against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

2. In a vehicle the combination of: a live load carrying primary structure including a skin-stressed shell, and a plurality of longitudinally spaced lateral reinforcing rings extending substantially continuously around and secured to the shell; a secondary structure including an end load column within and extending continuously along the bottom portion of the primary structure; load distributing members connecting the ends of said column to the lateral reinforcing rings at the ends of the primary structure; a rigid connection between said column and the shell at substantially their longitudinal centers, said column being not otherwise secured to the shell against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

3. In a vehicle the combination of: a live load carrying primary structure including a skin-stressed shell, a plurality of longitudinally spaced lateral reinforcing rings extending substantially continuously around and secured to the shell, and a plurality of laterally spaced longitudinal stiffening members extending continuously along the shell; a secondary structure including an end load column within and extending continuously along the bottom portion of the primary structure; a rigid connection between said column and the shell at substantially their longitudinal centers, said column being not otherwise rigidly secured to the shell against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

4. In a vehicle the combination of: a live load carrying primary structure including a skin-stressed shell, a plurality of longitudinally spaced lateral reinforcing rings extending substantially continuously around and secured to the shell, a plurality of laterally spaced longitudinal stiffening members extending continuously along and secured to the top of the shell, said stiffening members being independent of the lateral reinforcing rings, and a plurality of laterally spaced longitudinal reinforcing members extending continuously along the sides of the shell and secured to the lateral reinforcing rings; a secondary structure including an end load column within and extending continuously along the bottom portion of the primary structure; load distributing members connecting the ends of said column to the lateral reinforcing rings at the ends of the primary structure; a rigid connection between said column and the shell at substantially their longitudinal centers, said column being not otherwise secured to the shell against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

5. In a vehicle the combination of: a live load carrying primary structure including a skin-stressed shell having a plurality of longitudinally spaced lateral reinforcing rings extending substantially continuously around and secured to the shell; a secondary structure including an end load column within and extending along the bottom portion of the shell; end posts joining said column to the primary structure at each end thereof; lateral bracing and vertical load carrying members extending transversely of the shell and secured to the lateral reinforcing rings, said bracing members being also secured to the column to laterally stabilize it intermediate the end posts; a rigid connection between said column and the shell at substantially their longitudinal centers, said column being not otherwise secured to the shell against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

6. In a vehicle the combination of: a live load carrying primary structure including a skin-stressed shell having a plurality of longitudinally spaced lateral reinforcing rings extending substantially continuously around and secured to the shell; a secondary structure including an end load column within and extending along the bottom portion of the shell; end posts joining said column to the primary structure at each end thereof; lateral bracing and vertical load carrying members extending transversely of the shell and secured to the lateral reinforcing rings; vertical load supporting members secured between said lateral bracing members and the reinforcing rings at the bottom of the shell, said lateral and vertical members being also secured to the column to laterally stabilize it intermediate the end posts; a rigid connection between said column and the shell at substantially their longitudinal centers, said column being not otherwise secured to the shell against longitudinal movement thereto; and wheel support applied to the primary structure independently of the secondary structure, whereby the dead load of the primary structure is carried directly on the wheel support, the live load is carried by the primary structure, and the dead load of the secondary structure is carried by the primary structure.

7. In a vehicle the combination of: a live load carrying primary structure including a skin-stressed shell, having a plurality of longitudinally spaced lateral reinforcing rings extending substantially continuously around and secured to the shell, a plurality of laterally spaced longitudinal reinforcing members extending from end to end of the shell, and relatively heavy load distributing rings at each end of the shell secured to the ends of the longitudinal reinforcing members; a secondary structure including end posts spanning the load distributing rings and secured thereto; an end load column secured to and between said end posts to extend along and within the shell from end to end; a rigid connection between the column and shell at substantially their longitudinal centers, said column being not otherwise secured to the shell against longitudinal movement relative thereto; and wheel support applied to the primary structure independently of the secondary structure, whereby the dead load of the primary structure is carried directly on the wheel support, the live load is carried by the primary structure, and the dead load of the secondary structure is carried by the primary structure.

8. In a vehicle body adapted to be supported on trucks, the combination of: a skin-stressed outer shell; a plurality of longitudinally spaced lateral reinforcing rings extending substantially continuously around and secured to the shell; a live load carrying floor within and carried by the shell; truck recesses extending upwardly into the shell to points above the floor level on each side of the longitudinal center line of the shell and adjacent each end thereof, said recesses being defined by the outer shell, inner walls and end walls, the said end walls being rigidly connected to the side and top portions of adjacent reinforcing rings, whereby loads are distributed from the trucks to the shell and vice versa; and means secured to said end walls for supporting the body on the trucks.

9. In a vehicle, the combination of: a primary structure including a live load carrying tubular shell; a secondary structure including an end load column supported by the primary structure and extending substantially from end to end of the shell along its lower portion; connection between the primary and secondary structures stabilizing the secondary structure with reference to the primary structure laterally and vertically and supporting the dead load of the secondary structure but allowing independent relative longitudinal extension and compression of the two structures; and wheel support applied to the primary structure independently of the secondary structure, whereby the dead load of the primary structure is carried directly on the wheel support, the live load is carried by the primary structure, and the dead load of the secondary structure is carried by the primary structure.

10. In a vehicle, the combination of; a primary structure including a live load carrying tubular shell; a secondary structure including an end load column supported by the primary structure and extending substantially from end to end of the shell along its lower portion; a rigid connection between the primary and secondary structures at one point in their lengths; connections between the two structures at other points in their lengths stabilizing the secondary structure as to vertical and lateral movements with reference to the primary structure but allowing relative longitudinal freedom; and wheel support applied to the primary structure independently of the secondary structure, whereby the dead load of the primary structure is carried directly on the wheel support, the live load is carried by the primary structure, and the dead load of the secondary structure is carried by the primary structure.

11. In a vehicle, the combination of; a primary structure including a live load carrying tubular shell; a secondary structure including an end load column supported by the primary structure and extending substantially from end to end of the shell along its lower portion; connection between the primary and secondary structures stabilizing the secondary structure with reference to the primary structure laterally and vertically and supporting the dead load of the secondary structure but allowing independent relative longitudinal extension and compression of the two structures; and wheel support applied to the primary structure independently of the secondary structure, whereby the dead load of the primary structure is carried directly on the wheel support, the live load is carried by the primary structure, and the dead load of the secondary structure is carried by the primary structure; and longitudinal draft connection between the wheel support and the secondary structure independent of the primary structure.

12. In a vehicle, the combination of; a primary structure including a live load carrying tubular shell; a secondary structure including an end load column supported by the primary structure and extending substantially from end to end of the shell along its lower portion; a rigid connection between the primary and secondary structures at one point in their lengths; connections between the two structures at other points in their lengths stabilizing the secondary structure as to vertical and lateral movements with reference to the primary structure but allowing relative longitudinal freedom; and wheel support applied to the primary structure independently of the secondary structure, whereby the dead load of the primary structure is carried directly on the wheel support, the live load is carried by the primary structure, and the dead load of the secondary structure is carried by the primary structure; and longitudinal draft connection between the wheel support and the secondary structure independent of the primary structure.

13. In a vehicle, the combination of; a primary structure including a live load carrying tubular shell, and a live load carrying floor within and carried by the shell; a secondary structure including an end load column supported by the primary structure and extending substantially from end to end of the shell along its lower portion; connection between the primary and secondary structures stabilizing the secondary structure with reference to the primary structure laterally and vertically and supporting the dead load of the secondary structure but allowing independent relative longitudinal extension and compression of the two structures; a wheel unit; and means supporting the primary structure on the wheel unit for lateral, lateral swinging and vertical movements relative to the wheel unit, said supporting means engaging the primary structure at a level above the floor level and independently of the secondary structure.

14. In a vehicle, the combination of; a primary structure including a live load carrying tubular shell, and a live load carrying floor within and carried by the shell; a secondary structure including an end load column supported by the primary structure and extending substantially from end to end of the shell along its lower portion; connection between the primary and secondary structures stabilizing the secondary structure with reference to the primary structure laterally and vertically and supporting the dead load of the secondary structure but allowing independent relative longitudinal extension and compression of the two structures; a wheel unit; and means supporting the primary structure on the wheel unit for lateral, lateral swinging and vertical movements relative to the wheel unit, said supporting means engaging the primary structure at a level above the floor level and independently of the secondary structure; and longitudinal draft connection between the wheel unit and the secondary structure independent of the primary structure.

15. In a vehicle, the combination of; a primary structure including a live load carrying tubular shell, and a live load carrying floor within and carried by the shell; a secondary structure including an end load column supported by the primary structure and extending substantially from end to end of the shell along its lower portion; a rigid connection between the primary and secondary structures at one point in their lengths; connections between the two structures at other points in their lengths stabilizing the secondary structure as to vertical and lateral movements with reference to the primary structure but allowing relative longitudinal freedom; a wheel unit; and means supporting the primary structure on the wheel unit for lateral, lateral swinging and vertical movements relative to the wheel unit, said supporting means engaging the primary structure at a level above the floor level and independently of the secondary structure.

16. In a vehicle, the combination of; a primary structure including a live load carrying tubular shell, and a live load carrying floor within and carried by the shell; a secondary structure including an end load column supported by the primary structure and extending substantially from end to end of the shell along its lower portion; a rigid connection between the primary and secondary structures at one point in their lengths; connections between the two structures at other points in their lengths stabilizing the secondary structure as to vertical and lateral movements with reference to the primary structure but allowing relative longitudinal freedom; a wheel unit; and means supporting the primary structure on the wheel unit for lateral, lateral swinging and vertical movements relative to the wheel unit, said supporting means engaging the primary structure at a level above the floor level and independently of the secondary structure; and longitudinal draft connection between the wheel unit and the secondary structure independent of the primary structure.

17. In a vehicle, the combination of; a primary structure including a live load carrying tubular shell; a secondary structure including an end load column supported by the primary structure and extending substantially from end to end of the shell along its lower portion; a rigid connection between the primary and secondary structures at one point in their lengths; transversely extending end load distributing members connecting the ends of said column to the ends of the primary structure, said members supporting the ends of the column but allowing said ends relative longitudinal freedom; and wheel support applied to the primary structure independently of the secondary structure, whereby the dead load of the primary structure is carried directly on the wheel support, the live load is carried by the primary structure, and the dead load of the secondary structure is carried by the primary structure.

18. In a vehicle, the combination of; a primary structure including a live load carrying tubular shell; a secondary structure including an end load column supported by the primary structure and extending substantially from end to end of the shell along its lower portion; a rigid connection between the primary and secondary structures at one point in their lengths; transversely extending horizontal floor supporting beams extending across the shell and forming a part of the primary load carrying structure, said beams being connected to the end load column to support it and stabilize it laterally in the primary structure but allowing it longitudinal freedom with reference to the primary structure; and wheel support applied to the primary structure independently of the secondary structure, whereby the dead load of the primary structure is carried directly on the wheel support, the live load is carried by the primary structure, and the dead load of the secondary structure is carried by the primary structure.

19. In a vehicle, the combination of; a live load carrying primary structure including a tubular shell and a live load supporting floor structure extending across and vertically rigid with relation to the shell; a secondary structure including an end load column extending from end to end of the shell below the floor structure, said floor structure supporting the column and stabilizing it laterally in the shell but allowing it longitudinal freedom with relation to the shell; a wheel unit; and means supporting the primary structure on the wheel unit for lateral, lateral swinging and vertical movements relative to the wheel unit, said supporting means engaging the primary structure at a level above the floor structure and independently of the secondary structure.

20. In a vehicle, the combination of; a live load carrying primary structure including a tubular shell and a live load supporting floor structure extending across and vertically rigid with relation to the shell; a secondary structure including an end load column extending from end to end of the shell below the floor structure, said floor structure supporting the column and stabilizing it laterally in the shell but allowing it longitudinal freedom with relation to the shell; a wheel unit; means supporting the primary structure on the wheel unit for lateral, lateral swinging and vertical movements relative to the wheel unit, said supporting means engaging the primary structure at a level above the floor structure and independently of the secondary structure; and longitudinal draft connection between the wheel unit and the secondary structure column independent of the primary structure.

21. In a vehicle, the combination of; a primary structure including a live load carrying tubular shell; a secondary structure including an end load column supported by the primary structure and extending substantially from end to end of the shell along its lower portion; a rigid connection between the primary structure and the end load column rigidly supporting and constraining said column over a limited portion of its length, the remaining portion of the length of the column being substantially unconfined against relative endwise movement; and wheel support applied to the primary structure independently of the secondary structure, whereby the dead load of the primary structure is carried directly on the wheel support, the live load is carried by the primary structure, and the dead load of the secondary structure is carried by the primary structure.

22. In a vehicle body, the combination of: a load carrying outer tubular shell, a live load supporting floor within and carried by the shell, truck recesses extending upwardly into the shell to points above the floor level on each side of the longitudinal center of the shell and adjacent each end thereof, said recesses being in part defined by spaced end walls which lie in planes transverse of the length of the shell, the said end walls being rigidly connected to the side and top portions of the shell, and means for supporting the body on trucks including supporting members secured to said end walls.

ELIOT F. STONER.